United States Patent
Kodama et al.

(10) Patent No.: US 12,414,571 B2
(45) Date of Patent: Sep. 16, 2025

(54) SLICING DEVICE, AND METHOD FOR SLICING WORKPIECE

(71) Applicant: MAYEKAWA MFG. CO., LTD., Tokyo (JP)

(72) Inventors: Ryuji Kodama, Tokyo (JP); Hiroyuki Usui, Tokyo (JP); Seiichiro Umeda, Tokyo (JP); Osamu Goto, Tokyo (JP); Shinji Hane, Tokyo (JP); Naoki Toyoda, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 0 days.

(21) Appl. No.: 18/835,278

(22) PCT Filed: May 10, 2023

(86) PCT No.: PCT/JP2023/017504
§ 371 (c)(1),
(2) Date: Aug. 1, 2024

(87) PCT Pub. No.: WO2023/219092
PCT Pub. Date: Nov. 16, 2023

(65) Prior Publication Data
US 2025/0151738 A1    May 15, 2025

(30) Foreign Application Priority Data
May 11, 2022  (JP) .................. 2022-078121

(51) Int. Cl.
*A22C 17/00*   (2006.01)
*A22C 17/02*   (2006.01)

(52) U.S. Cl.
CPC .......... *A22C 17/02* (2013.01); *A22C 17/0033* (2013.01)

(58) Field of Classification Search
CPC ... A22C 17/02; A22C 17/033; A22C 21/0069; A22C 17/004; A22C 21/003; A22B 5/035
(Continued)

(56) References Cited

U.S. PATENT DOCUMENTS

| | | |
|---|---|---|
| 2,470,078 A | 5/1949 | Hoenselaar |
| 4,843,682 A | 7/1989 | Bowen |

(Continued)

FOREIGN PATENT DOCUMENTS

| | | |
|---|---|---|
| EP | 2277384 A1 | 1/2011 |
| JP | H02-177849 A | 7/1990 |

(Continued)

OTHER PUBLICATIONS

International Search Report Issued in Corresponding PCT Application No. PCT/JP2023/017504, dated Jul. 11, 2023. (4 Pages with English Translation).

(Continued)

*Primary Examiner* — Richard T Price, Jr.
(74) *Attorney, Agent, or Firm* — Osha Bergman Watanabe & Burton LLP

(57) ABSTRACT

A slicing device includes cutter device, workpiece holding part, relative movement device, and slicing position operating part. The cutter device has slicing blade that is driven in a direction along a blade surface. The workpiece holding part holds workpiece. The relative movement device moves the workpiece holding part and the cutter device relative to one another in slicing direction in which meat of a workpiece is sliced. The slicing position operating part moves the slicing blade of the cutter device toward and away with respect to the workpiece, which moves relatively in the slicing direction, from a direction intersecting the slicing direction. A blade surface portion that cuts the workpiece along a driving direction of the slicing blade and a pressing (Continued)

portion that presses an outer surface of the workpiece are alternately disposed at a position of the slicing blade where the slicing blade comes into contact with the workpiece.

4 Claims, 4 Drawing Sheets

(58) Field of Classification Search
USPC .......................................................... 452/149
See application file for complete search history.

(56) References Cited

U.S. PATENT DOCUMENTS

| 5,277,649 | A | 1/1994 | Adkison | |
|---|---|---|---|---|
| 2020/0345019 | A1* | 11/2020 | Voelkl | A22B 5/0029 |
| 2022/0022471 | A1* | 1/2022 | Esarey | A22B 5/166 |

FOREIGN PATENT DOCUMENTS

| JP | 2005-144598 | A | 6/2005 |
|---|---|---|---|
| JP | 2009-515519 | A | 4/2009 |
| JP | 5331244 | B2 | 10/2013 |
| JP | 2016-106533 | A | 6/2016 |
| JP | 2019-509743 | A | 4/2019 |
| TW | 201929677 | A | 8/2019 |
| WO | 2008047491 | A1 | 4/2008 |
| WO | 2009-139032 | A1 | 11/2009 |
| WO | 2017-164734 | A1 | 9/2017 |

OTHER PUBLICATIONS

Notice of Allowance Issued in Corresponding Taiwanese Application No. 112117271, dated Jan. 5, 2024. (6 Pages with English Translation).

European Search Report in corresponding European Application No. 23803567.9, dated Jul. 24, 2025 (5 pages).

* cited by examiner

SLICING DEVICE, AND METHOD FOR SLICING WORKPIECE

TECHNICAL FIELD

The present invention relates to a slicing device that separates a meat part from a workpiece such as bone-in meat, and a slicing method for a workpiece.

Priority is claimed on Japanese Patent Application No. 2022-078121, filed May 11, 2022, the content of which is incorporated herein by reference.

BACKGROUND ART

In recent years, a meat part separating device (a boning device) that mechanically separates a meat part from a bone part of bone-in meat such as poultry leg meat has been developed.

This type of meat part separating device makes incisions in advance at appropriate places in the meat part of bone-in meat using a cutting device, and then separates the meat part from the bone part using a meat separator while a clamper holding an end portion of the bone part is lifted. The meat separator has a tearing-off claw that is inserted into the incision in the meat part so as to come into contact with an outer peripheral surface of the bone part of the bone-in meat. The meat part separating device can separate the meat part from the bone part by lifting the bone part while pressing the tearing-off claw of the meat separator against the outer peripheral surface of the bone part of the bone-in meat.

Incidentally, in the case of poultry leg meat, there is a knee joint in the middle of the bone part in a longitudinal direction, and a part of the meat part is firmly connected to the knee joint by tendons or fascia. For this reason, the meat part separating device that handles poultry leg meat and the like is equipped with a cutter device for cutting the tendons and fascia that connect the meat part and the bone part (refer to, for example, Patent Document 1).

A meat part separating device (a boning device) described in Patent Document 1 includes a meat separator for tearing off a meat part from a bone part, and a cutter device for cutting tendons and fascia. The cutter device uses a round blade that is rotationally driven. The round blade has a uniform blade surface over the entire outer peripheral edge portion.

When the meat part is actually separated from bone-in meat, the tearing-off claw of the meat separator is brought into contact with the outer peripheral surface of the bone part of the bone-in meat and the bone part is raised in this state, and thus the meat is separated by the meat separator until a position at which the tendons and fascia of the knee joint are exposed. Then, in this state, the round blade of the cutter device is brought close to the knee joint, and the tendons and fascia near the knee joint are cut by the round blade. Then, the bone part of the bone-in meat is further raised, and thus the remaining meat part is separated from the bone part by the meat separator.

CITATION LIST

Patent Document

[Patent Document 1]
Japanese Patent No. 5331244

SUMMARY OF INVENTION

Technical Problem

However, when the tendons or fascia are cut with the round blade of the cutter device in the state in which the tendon or fascia is exposed by the meat separator as described above, it is necessary to accurately control a cutting position with the round blade in a longitudinal direction of the bone part in millimeter units. When the cutting position with the round blade deviates slightly from an appropriate position, extra meat parts will remain on the bone part, and the yield of the meat parts as a product is reduced. Furthermore, in accordance with the cutting position with the round blade, a hole may be formed in the separated meat part, leading to a decrease in the quality of the meat part as a product.

As a countermeasure against this, it is conceivable to make that a rotating round blade is lightly pressed in a direction perpendicular to the longitudinal direction against the outer peripheral surface of the bone part that moves relatively in the longitudinal direction, and the meat part including tendons and fascia around the bone part is continuously sliced away. However, in this case, when trying to slice the meat part away while continuously rotating the round blade, a blade edge of the round blade may cut into the cartilage or hard bones of the bone-in meat, and thus making it difficult to continue smooth slicing off of the meat part. Furthermore, when the blade edge of the round blade cuts into the cartilage or hard bones of the bone-in meat, residual bone may enter the separated meat part, or chipping of the blade edge of the round blade may occur more easily.

Aspects of the present invention provide a slicing device and a method for slicing a workpiece, which can suppress a blade edge cutting into a core part of a workpiece.

Solution to Problem

A slicing device and a method for slicing a workpiece according to the present invention employ the following configuration.

A slicing device according to the present invention includes a cutter device having a slicing blade that is driven in a direction along a blade surface, a workpiece holding part configured to hold the workpiece, a relative movement device configured to relatively move the workpiece holding part and the cutter device in a slicing direction in which a meat of the workpiece is sliced, and a slicing position operating part configured to move the slicing blade of the cutter device toward and away with respect to the workpiece, that moves relatively in the slicing direction, in a direction intersecting the slicing direction, wherein a blade surface portion that cuts the workpiece and a pressing portion that presses an outer surface of the workpiece are alternately disposed at a position of the slicing blade where the slicing blade comes into contact with the workpiece in a driving direction of the slicing blade.

In the above configuration, when the meat part of the workpiece is sliced, the workpiece is held by the workpiece holding part, and the workpiece holding part and the cutter device are relatively moved in the slicing direction by the relative movement device. In this state, the slicing blade of the cutter device is driven in a direction along the blade surface, and the slicing position operating part brings the slicing blade of the cutter device close to a slicing portion of the workpiece. Thus, the slicing blade is pressed against a core part of the workpiece, and as the workpiece is relatively moved in the slicing direction, the meat part of the workpiece is sliced by the slicing blade. At this time, in the slicing blade that is driven in the direction along the blade surface, the blade surface portion that cuts the workpiece and the pressing portion that presses the outer surface of the workpiece alternately face the workpiece. Thus, when the blade edges of some of the blade surface portions try to cut into the workpiece, immediately after that, the adjacent pressing portion presses the workpiece and releases the cutting-in, and as a result, the cutting-in of the blade edge in the core part of the workpiece is suppressed.

The workpiece may be bone-in meat with a meat part attached to a bone part, the workpiece holding part may hold the bone part of the bone-in meat, and the cutter device may slice the meat part of the bone-in meat from the bone part.

In this case, since there is a complicated joint between the bone parts, and cartilage and hard bones are mixed in a complicated manner in bone part, it is possible to reliably slice away the meat part from the bone part of the bone-in meat, which was thought to be difficult in the related art.

A method for slicing a workpiece according to the present invention includes using a slicing blade in which a blade surface portion that cuts a workpiece and a pressing portion that presses an outer surface of the workpiece are alternately disposed at a position of the slicing blade where the slicing blade comes into contact with the workpiece in a driving direction, driving the slicing blade and relatively moving the workpiece and the slicing blade in a slicing direction, and displacing the slicing blade with respect to the relatively moving workpiece from a direction intersecting the slicing direction.

In this case, the slicing blade in which the blade surface portion and the pressing portion are disposed alternately at a position in which the slicing blade comes into contact with the workpiece is driven, and in this state, the slicing blade is pressed against the relatively moving workpiece in a direction that intersects the slicing direction. As a result, the meat part of the workpiece can be easily sliced away from the core part of the workpiece without causing the blade edge of the slicing blade to cut into the core part.

The workpiece may be bone-in meat with a meat part attached to a bone part, and a position of the slicing blade in a direction intersecting the slicing direction may be displaced along an outer surface shape of the bone part with respect to the bone-in meat that relatively moves in a longitudinal direction of the bone part.

Advantageous Effects of Invention

In the slicing device and the method for slicing a workpiece according to the present invention, since the blade surface portion and the pressing portion of the slicing blade alternately face the workpiece when the workpiece is sliced, it is possible to suppress the blade edge cutting into the core portion of the workpiece.

Therefore, in the case in which the slicing device and the method for slicing according to the present invention are adopted, when the workpiece is bone-in meat, due to the smooth slicing with respect to the meat part, a decrease in the yield of the meat part as a product, deterioration in the quality such as hole opening, and the like can be suppressed, and mixing of residual bones into the meat part and occurrence of chipping of the blade edge due to the blade edge cutting into the bone part can be also suppressed.

DESCRIPTION OF EMBODIMENTS

An embodiment of the present invention will be described below on the basis of the drawings. Materials, shapes, relative arrangements, and the like of the constituent components described in the following embodiment are not intended to limit the scope of the present invention unless otherwise specified.

Figure 1:
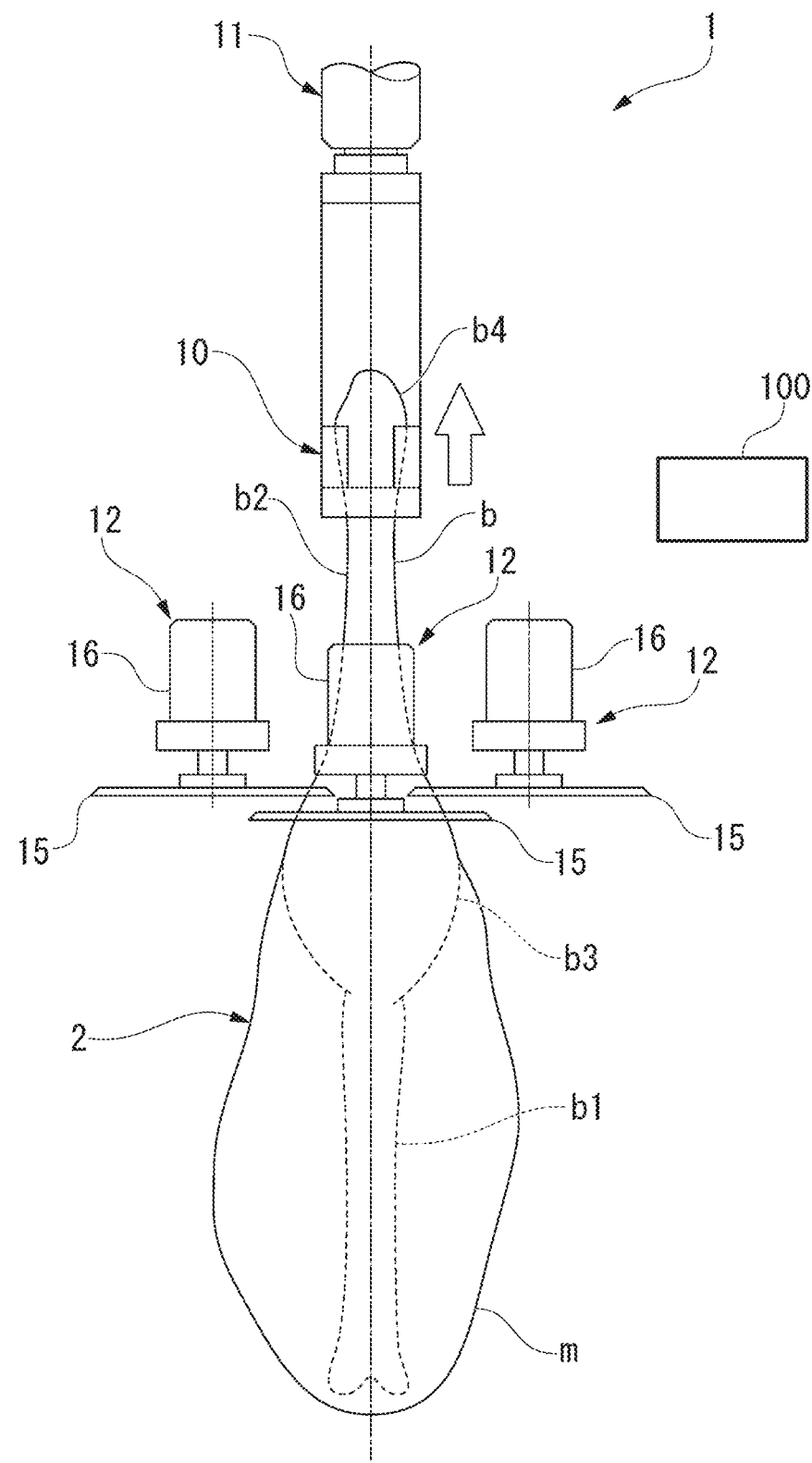
FIG. 1 is a front view of a slicing device according to an embodiment of the present invention.
Figure 2:
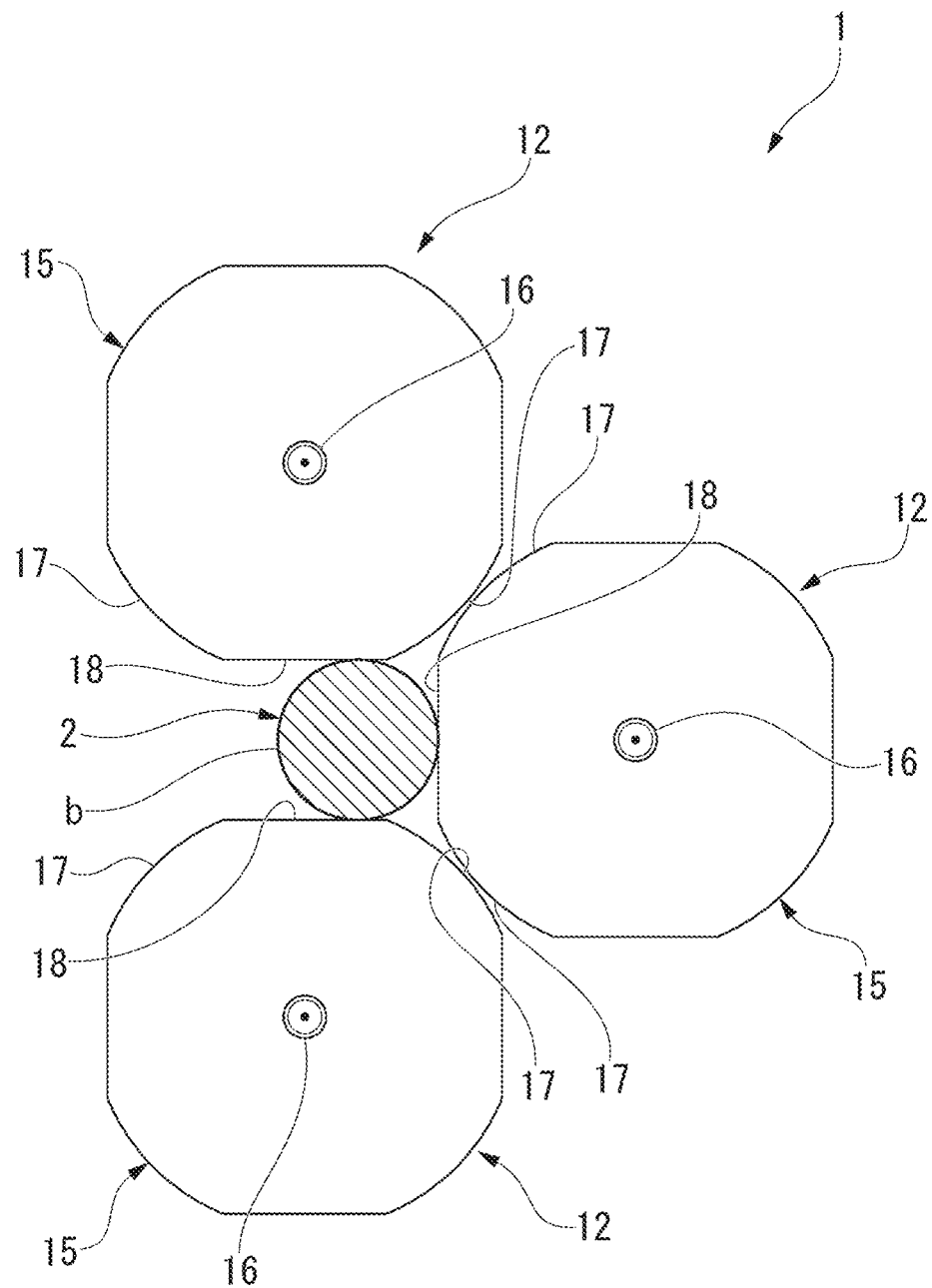
FIG. 2 is a top view of a plurality of cutter devices according to the embodiment of the present invention.
Figure 3:
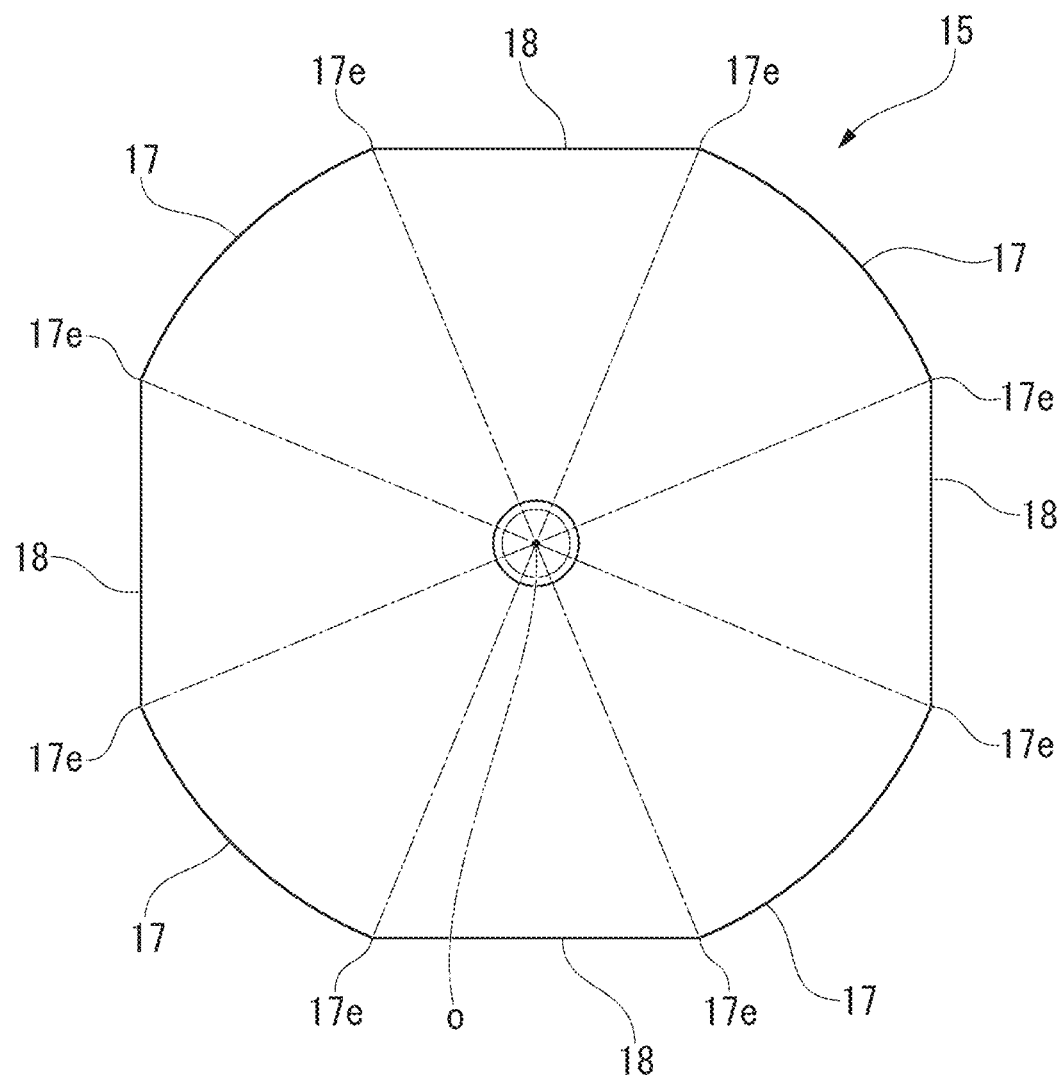
FIG. 3 is a top view of a round blade according to the embodiment of the present invention.

FIG. 1 is a front view of a slicing device 1 of this embodiment. FIG. 2 is a top view of a plurality of cutter devices 12 according to the embodiment of the present invention. FIG. 3 is a top view of a round blade 15 according to the embodiment of the present invention.

The slicing device 1 is a device for separating a meat part from a workpiece, in which the meat part (a separating target part) is present around a core part extending in a longitudinal direction, by slicing. For example, the slicing device 1 is used to separate a meat part m from a bone part b of bone-in meat 2 (a workpiece) such as poultry leg meat. In the following, poultry leg meat which is the bone-in meat 2 will be described as an example of the workpiece. In the poultry leg meat (the bone-in meat 2), a femur b1 and a tibia b2 are connected by a knee joint b3, and an ankle b4 is connected to an end portion of the tibia b2.

The slicing device 1 shown in FIG. 1 includes a clamper 10 (a workpiece holding part) that holds the ankle b4 (the bone part b) with the bone-in meat 2 facing downward, a lifting device 11 (a relative movement device) that raises and lowers the clamper 10, a plurality of cutter devices 12 that separates the meat part m from the bone part b of the bone-in meat 2 by slicing in cooperation with a lifting operation of the clamper 10, and a cutter moving device (a slicing position operating part) 100 that moves the cutter devices 12 toward and away (to displace positions of the cutter devices 12) from the bone-in meat 2, which moves relatively in an up-down direction (a slicing direction), in a horizontal direction (a direction intersecting the slicing direction). In this embodiment, as shown in FIG. 2, three cutter devices 12 are disposed so as to surround the bone part b of the bone-in meat 2 suspended by the clamper 10. However, the number of installed cutter devices 12 is not limited to three.

The slicing device 1 shown in FIG. 1 is installed at a processing station that separates the meat part m from the bone part b of the bone-in meat 2 by slicing, and the bone-in meat 2 is conveyed from another processing station after being pre-processed. In other processing stations at the previous stages, for example, cut processing is performed with respect to the meat part m around an end portion of the tibia b2 on the ankle b4 side, slit-forming processing is performed on the meat part m in the longitudinal direction of the bone part b, and the like. The common clamper 10 moves between the processing stations while holding the ankle b4 of the bone-in meat 2.

The clamper 10 has a structure capable of holding and releasing the ankle b4 of the bone-in meat 2.

The lifting device 11 moves the bone part b of the bone-in meat 2 relative to the cutter device 12 in the up-down direction by raising the clamper 10 holding the bone part b (the ankle b4) of the bone-in meat 2 at a predetermined speed. In this embodiment, the lifting device 11 raises the bone part b of the bone-in meat 2 upward with respect to the cutter device 12 of which a position in the up-down direction is fixed, and thus the meat part m can be sliced away by the cutter device 12. In this embodiment, the lifting device 11 constitutes a relative movement device.

However, it is also possible to fix the bone part b of the bone-in meat 2 with the clamper 10 and to move the cutter device 12 downward. In this case, a device that moves the cutter device 12 downward constitutes the relative movement device.

The cutter device 12 includes a round blade 15 (a slicing blade) for slicing that rotates in a horizontal posture, and a drive unit 16 that rotates the round blade 15. The drive unit 16 of each of the cutter devices 12 is held by a corresponding cutter moving device.

In the cutter moving device, for example, the cutter device 12 (the drive unit 16) is held at a tip end of an arm part that is horizontally rotatable around a drive shaft. Each of the arm parts of the cutter moving device horizontally moves the round blade 15 of the cutter device 12 from an initial position having a gap from the bone part b of the bone-in meat 2 to a position close to the bone part b (hereinafter, referred to as a "proximity position"). Further, after the round blade 15 cuts the meat part m of the bone-in meat 2, the cutter moving device horizontally moves the round blade 15 of the cutter device 12 to the initial position having a gap from the bone part b of the bone-in meat 2. The cutter moving device includes an actuator (not shown) such as an air cylinder for moving the round blade 15 of the cutter device 12 between the initial position and the proximity position via the arm part. A biasing part such as a spring member for biasing the cutter device 12 in a direction of an outer peripheral surface of the bone part b of the bone-in meat 2 is provided on any one of the actuator and the arm part.

When the three cutter devices 12 are moved to the proximity positions by the cutter moving device, each of the round blades 15 surrounds the bone part b of the bone-in meat 2 at equal intervals.

In the round blade 15 shown in FIG. 3, a plurality of blade surfaces (blade surface portions) 17 each having an arc shape are disposed to be spaced apart from each other around a rotation center o of a round blade main body on the outer peripheral portion of the round blade main body having a disc shape and of which a center portion is connected to a rotating shaft of the drive unit 16. Further, a pressing portion 18 on which no blade surface 17 is formed is arranged between the adjacent blade surfaces 17 on the outer peripheral portion of the round blade main body. The blade surface (the blade surface portion) 17 cuts the meat part m of the bone-in meat 2 by rotation of the round blade main body, and the pressing portion 18 presses an outer surface of the meat part m and the bone part b of the bone-in meat 2 by the rotation of the round blade main body.

Each of the blade surfaces 17 is formed such that ridge lines of the respective blade edges are arranged on a circumference of a constant radius centered on the rotation center o. Further, the blade edge of each of the blade surfaces 17 converges toward the outside of the round blade body in a radial direction, and is formed so that the ridge lines of the rotating blade edges are aligned in a straight line when the round blade main body is seen in a direction perpendicular to a rotation axis.

In the case of this embodiment, the blade surfaces 17 and the pressing portions 18 disposed on the outer peripheral portion of the round blade main body are alternately formed in equiangular regions around the rotation center o.

Further, in the pressing portion 18 formed on the outer peripheral part of the round blade main body, an outer end portion thereof in the radial direction is located radially inward than a ridge line portion of the blade edge of the blade surface 17 (an outer end of the blade surface in the radial direction). Specifically, the outer edge portion of the pressing portion 18 in the radial direction is formed in a linear shape that connects end portions 17*e* of the blade edges of the adjacent blade surfaces 17 in a circumferential direction.

The round blade 15 is rotated by power of the drive unit 16, and in this state, when the outer peripheral portion of the round blade body is pressed in the horizontal direction against the bone part b of the bone-in meat 2 and the meat part m in a vicinity thereof, the blade surface 17 and the pressing portion 18 on the outer peripheral portion of the round blade main body alternately face a direction toward the bone part b of the bone-in meat 2. Therefore, when the round blade main body rotates, cutting of the meat part m by the blade surface 17 and pressing against the bone part b by the pressing portion 18 (release of the cutting-in of the blade surface) are performed alternately.

Figure 4:
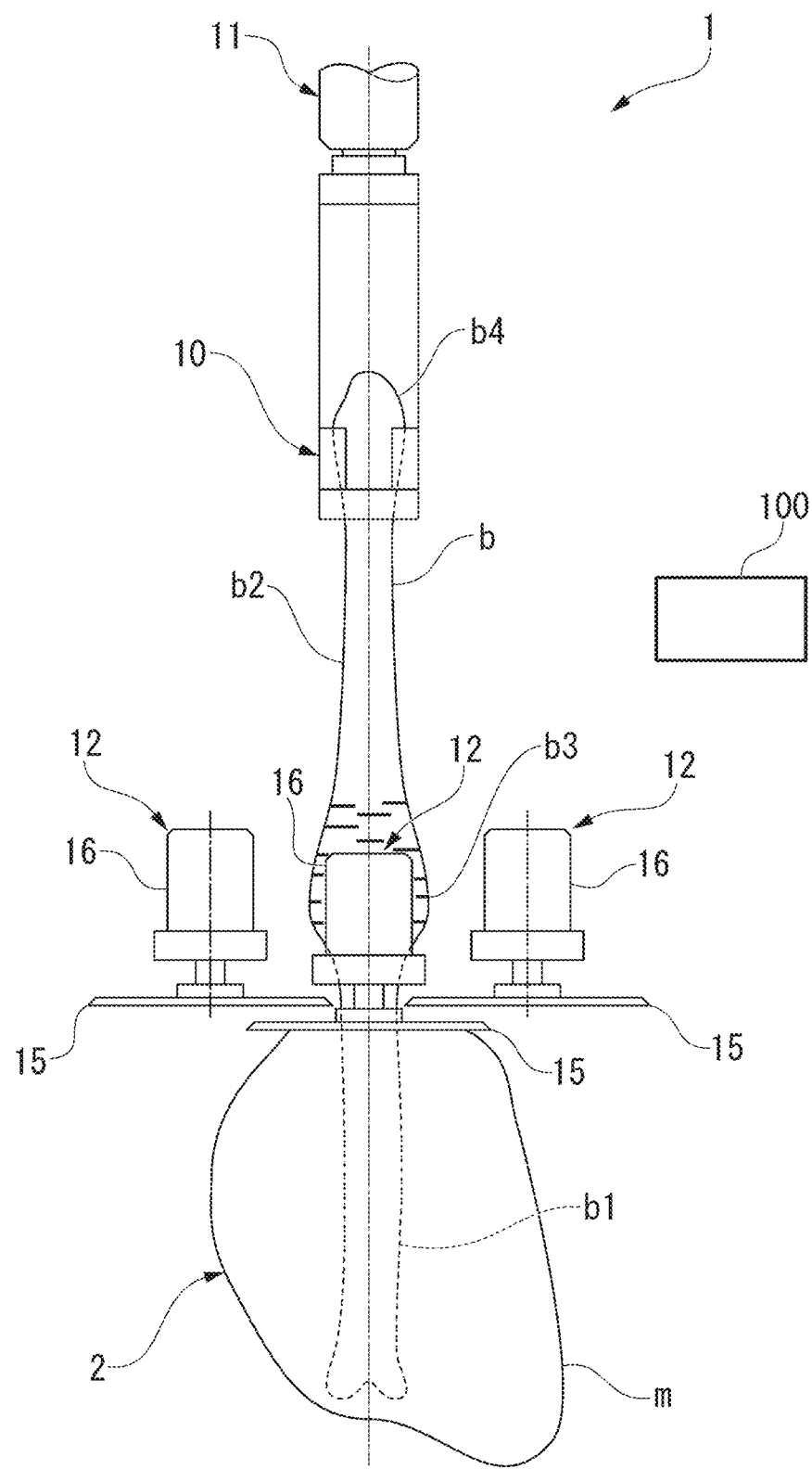
FIG. 4 is a front view showing an operation state of the slicing device according to the embodiment of the present invention.

FIG. 1 shows a state in which the round blade 15 of the cutter device 12 is slicing the meat part m around the tibia b2 of the bone-in meat 2. On the other hand, FIG. 4 shows a state in which the round blade 15 of the cutter device 12 is slicing the meat part m from the knee joint b3 to a part of the femur b1 of the bone-in meat 2. FIG. 4 is a front view of the slicing device 1 similar to FIG. 1.

In a state shown in FIG. 4, when the bone-in meat 2 held by the clamper 10 passes through the round blade 15 of the cutter device 12, the tendon and fascia around the knee joint b3 are sequentially sliced away by the round blade 15 along with other surrounding meat parts m.

Next, details of a slicing process (a slicing method) of the bone-in meat 2 by the slicing device 1 will be described.

The bone-in meat 2 held by the clamper 10 and located at a lowered position has undergone the cutting processing with respect to the meat part m around an end portion of the tibia b2 closer to the ankle b4 and the slit-forming processing on the meat part m along the longitudinal direction of the bone part b at another processing station in the previous stage.

From this state, when the clamper 10 is lifted upward by the lifting device 11, and when a cut portion at the end portion of the tibia b2 of the bone-in meat 2 approaches an installation height of the cutter device 12, the cutter moving device is operated to move the round blades 15 of the plurality of cutter devices 12 to a position close to the bone part b. At this time, the round blade 15 of each of the cutter devices 12 are being rotated by the driving of the drive unit 16, and the outer peripheral portion of the round blade main body comes into contact with the outer peripheral surface of the bone part b via the cut portion of the meat part m.

As the bone part b continues to rise via the clamper 10 from this state, the meat part m is continuously sliced away from the outer periphery of the bone part b from the upper side toward the lower side by the rotation of the round blade 15. At this time, since each of the cutter devices 12 is elastically biased in the direction toward the bone part b by an biasing part (not shown), the outer peripheral portion of the round blade 15 of each of the cutter devices 12 follows a change in a shape of an outer surface of the bone part b and continues to be in contact with the bone part b (a position of the outer peripheral portion of the round blade 15 of each of the cutter devices 12 is displaced so as to follow the change in the shape of the outer surface of the bone part b).

For example, when a portion near the knee joint b3 of the bone-in meat 2 moves up to the round blade 15 of each of the cutter devices 12 due to the rise of the bone part b via the clamper 10, the tendons and fascia connected to the knee joint b3 are continuously sliced away together with other meat parts m by the rotating round blade 15. Since the knee joint b3 has a complex external shape and is a part in which cartilage and hard bones are mixed, the blade edge of the blade surface of the rotating round blade 15 easily cuts into the cartilage and hard bones of the knee joint b3. However, since the blade surfaces 17 having an arc shape and the pressing portions 18 of which end portions in the radial direction are located inside the blade surfaces 17 are disposed alternately on the outer peripheral portion of the round blade main body of the round blade 15, the pressing portion 18 suppress the blade surface 17 cutting into the cartilage or hard bones.

In this way, when an upper end portion of the femur b1 of the bone-in meat 2 rises to a height position of the round blade 15 of each of the cutter devices 12, the slicing of the meat part m by the round blade 15 ends at that point.

As described above, in the slicing device 1 of the present embodiment, the blade surfaces (the blade surface portions) 17 that cut the meat part m of the bone-in meat 2 and the pressing portions 18 that press the outer surfaces of the meat part m and bone part b of the bone-in meat 2 are disposed alternately on the outer peripheral portion of the round blade 15 (the slicing blade) for slicing-away that comes into contact with the bone-in meat 2. Thus, when the rotating round blade 15 is pressed in the horizontal direction against the relatively moving bone-in meat 2 when the bone-in meat 2 is sliced away, the blade surfaces 17 and the pressing portions 18 of the round blades 15 alternately face the bone-in meat 2. Therefore, when the blade edge of some of the blade surfaces 17 tries to cut into the bone part b of the bone-in meat 2, immediately after that, the adjacent pressing portion 18 presses the bone part b so as to release the cutting-in, and as a result, the cutting-in of the blade edge of the blade into the bone part b is suppressed.

Therefore, when the slicing device 1 of this embodiment is adopted, due to the smooth slicing with respect to the meat part m, a decrease in the yield of the meat part m as a product, deterioration in the quality such as hole opening, and the like can be suppressed, and the mixing of residual bones into the meat part m and the occurrence of chipping of the blade edge due to the blade edge cutting into the bone part b can be suppressed.

The slicing device 1 of this embodiment employs the rotating round blade 15 as a slicing blade for slicing away the meat part m of the bone-in meat 2. However, the slicing blade is not limited to the rotating round blade 15, and may be, for example, a straight blade of which a blade edge of the blade surface extends linearly and cuts an object by reciprocating motion. In this case as well, the plurality of blade surfaces and pressing portions are disposed alternately at the portion that is in contact with the bone-in meat. Preferably, the pressing portion has a shape slightly recessed relative to the blade edge of the adjacent blade surface, and more preferably a shape that is recessed in a smooth arc shape from the end portion of the blade edge of the adjacent blade surface.

However, in the slicing device 1 of this embodiment, the rotating round blade 15 is employed as the slicing blade, and the blade surfaces 17 and the pressing portions 18 are alternately disposed on the outer peripheral portion of the round blade main body, and the outer end portion of each of the pressing portions 18 in the radial direction is located radially inward than the blade edge of the blade surface 17. Therefore, smooth slicing can be performed as described above, and a cutting part of the cutter device 12 can be downsized.

Therefore, when the present configuration is adopted, the plurality of cutter devices 12 are disposed around the relatively moving bone-in meat 2, and the meat part m of the bone-in meat 2 can be efficiently and reliably sliced away.

Further, in the present embodiment, the pressing portion 18 of the round blade 15 is formed in a linear shape in which the outer edge of the round blade 15 in the radial direction connects the end portions 17e of the blade edges of the adjacent blade surfaces 17 in the circumferential direction. Therefore, a concave stepped portion cannot be formed between the blade surface 17 and the pressing portion 18 on the outer periphery of the round blade main body. Therefore, in the case in which the present configuration is adopted, when the round blade main body is rotated, even when a starting end portion or a terminal end portion of the blade surface in a rotating direction comes into contact with a hard portion or a sharp portion of the bone part, chipping is less likely to occur on the blade surface.

In addition, in the case of this configuration, since there is no concave stepped portion between the blade surface 17 and the pressing portion 18, when the meat part m is sliced away by the round blade 15, pieces of the separated meat part m are less likely to be caught on the starting end portion and the terminal end portion of the blade surface 17 in the rotating direction. As a result, the slicing of the meat part m is not obstructed by accumulation of pieces of meat on the round blade 15, and it becomes possible to continue separating the meat part m smoothly.

Further, in the slicing device 1 of this embodiment, the cutter moving device 100, which is a cutting position operating unit, is equipped with a biasing part such as a spring member that biases the round blade 15 of the cutter device 12 in the direction of the bone part b of the bone-in meat 2. Therefore, when the bone-in meat 2 is sliced, the outer peripheral portion of the round blade 15 is elastically pressed against the outer peripheral surface of the bone part b by an appropriate biasing force, and the round blade 15 can be made to smoothly follow the outer surface shape of the bone part b.

Therefore, when the slicing device 1 of the present embodiment is employed, the yield of the separated meat part m which is a product can be further increased.

The use of the round blade 15 of the present embodiment is not limited to slicing bone-in meat 2, and it can be used for slicing various types of workpieces as long as the workpiece has a meat part (not limited to edible meat) around a core part that is harder than other parts.

However, when the round blade 15 is used to slice away the meat part m of the bone-in meat 2 as in this embodiment, even there is a complicated joint between the bone parts b such as the knee joint b3, and cartilage and hard bones are mixed in a complicated manner in bone part b, it is possible to reliably slice away the meat part m from the bone part b, which was thought to be difficult in the related art.

The present invention is not limited to the above-described embodiments, and various design changes are possible without departing from the scope thereof.

For example, in the above embodiment, the outer edge portion of the pressing portion 18 of the round blade main body in the radial direction is formed in a linear shape that connects the end portions 17e of the blade edges of the adjacent blade surfaces 17 in the circumferential direction, but the shape of the outer edge portion of the pressing portion 18 in the radial direction is not limited thereto. The shape of the outer edge portion of the pressing portion 18 in the radial direction may be a non-linear shape including at least a portion of a curved portion.

However, when the outer edge portion of the pressing portion 18 in the radial direction has a non-linear shape, preferably, the shape does not protrude from the region between the straight line connecting the end portions 17e of the blade edges of adjacent blade surfaces 17 in the circumferential direction and a virtual circle passing through the blade edges of the blade surfaces 17. In this case, it is particularly advantageous from the viewpoint of maintaining strength of the blade surface 17 and preventing pieces of meat from being caught.

REFERENCE SIGNS LIST

1 Slicing device
2 Bone-in meat (workpiece)
10 Clamper (workpiece holding part)
11 Lifting device (relative movement device)
12 Cutter device
15 Round blade (slicing blade)
17 Blade surface
18 Pressing portion
100 Cutter moving device (slicing position operating part)

The invention claimed is:

1. A slicing device comprising:
 a cutter device having a slicing blade that is driven in a direction along a blade surface;
 a workpiece holding part configured to hold the workpiece;
 a relative movement device configured to relatively move the workpiece holding part and the cutter device in a slicing direction in which a meat of the workpiece is sliced; and
 a slicing position operating part configured to move the slicing blade of the cutter device toward and away with respect to the workpiece, that moves relatively in the slicing direction, in a direction intersecting the slicing direction,
 wherein a blade surface portion that cuts the workpiece and a pressing portion that presses an outer surface of the workpiece are alternately disposed at a position of the slicing blade where the slicing blade comes into contact with the workpiece in a driving direction of the slicing blade.

2. The slicing device according to claim 1, wherein the workpiece is bone-in meat with a meat part attached to a bone part,
 the workpiece holding part holds the bone part of the bone-in meat, and
 the cutter device slices the meat part of the bone-in meat from the bone part.

3. A method for slicing a workpiece, comprising:
 using a slicing blade in which a blade surface portion that cuts a workpiece and a pressing portion that presses an outer surface of the workpiece are alternately disposed at a position of the slicing blade where the slicing blade comes into contact with the workpiece in a driving direction;
 driving the slicing blade and relatively moving the workpiece and the slicing blade in a slicing direction; and
 displacing the slicing blade with respect to the relatively moving workpiece from a direction intersecting the slicing direction.

4. The method for slicing a workpiece according to claim 3, wherein the workpiece is bone-in meat with a meat part attached to a bone part, and
 a position of the slicing blade in a direction intersecting the slicing direction is displaced along an outer surface shape of the bone part with respect to the bone-in meat that relatively moves in a longitudinal direction of the bone part.

* * * * *